US008317621B2

(12) United States Patent
Yasue

(10) Patent No.: US 8,317,621 B2
(45) Date of Patent: Nov. 27, 2012

(54) VIDEO GAME PROCESSING DEVICE, VIDEO GAME PROCESSING METHOD AND VIDEO GAME PROCESSING PROGRAM

(75) Inventor: Tai Yasue, Osaka-fu (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 618 days.

(21) Appl. No.: 12/546,105

(22) Filed: Aug. 24, 2009

(65) Prior Publication Data

US 2010/0056282 A1    Mar. 4, 2010

(30) Foreign Application Priority Data

Aug. 28, 2008  (JP) .................................. 2008-219191

(51) Int. Cl.
  *A63F 9/24* (2006.01)
  *A63F 13/00* (2006.01)
  *G06F 17/00* (2011.01)
  *G06F 19/00* (2011.01)
(52) U.S. Cl. .................... 463/42; 463/31; 463/7; 463/8; 463/23; 463/10
(58) Field of Classification Search ..................... 463/42
  See application file for complete search history.

(56) References Cited

U.S. PATENT DOCUMENTS

| 2002/0098890 A1 | 7/2002 | Sakaguchi |
| 2003/0040364 A1 | 2/2003 | Yabe et al. |
| 2004/0209684 A1 | 10/2004 | Hisano |
| 2008/0119268 A1 | 5/2008 | Kando et al. |
| 2008/0139310 A1 | 6/2008 | Kando et al. |
| 2008/0146333 A1 | 6/2008 | Kando et al. |
| 2008/0146335 A1 | 6/2008 | Toriyama |
| 2008/0293466 A1 | 11/2008 | Arakawa et al. |

FOREIGN PATENT DOCUMENTS

| EP | 1291049 | 3/2003 |
| JP | 2003-62345 | 3/2003 |

(Continued)

OTHER PUBLICATIONS

Quake 3 Arena, 2002, id software, manual, guide, and gameplay video (http://web.archive.org/web/20020603021159/http://www.bosskey.net/q3a/, http://www.youtube.com/watch?v=vaVhcnBiob0).*

(Continued)

*Primary Examiner* — Michael Cuff
*Assistant Examiner* — Kevin Y Kim
(74) *Attorney, Agent, or Firm* — Greenblum & Bernstein, P.L.C.

(57) ABSTRACT

Data communication is carried out with any of other video game processing devices. Commands are distributed to each of other player characters operated by each of other players of the other video game processing devices. Each of the commands causes a predetermined special effect to the player character. A command releasing operation in which by erasing one or more command from the retained commands the one or more command is released is performed at a time when a predetermined releasing condition is satisfied. The released commands are visualized as icons. A distance between each of the released command icons and the player character is determined. The player character is caused to newly retain any of the released commands in the case where it is determined that the player character exists inside a predetermined distance from the released command icon indicating the released command.

17 Claims, 7 Drawing Sheets

FOREIGN PATENT DOCUMENTS

| | | |
|---|---|---|
| JP | 2003-79941 | 3/2003 |
| JP | 2005-6766 | 1/2005 |

OTHER PUBLICATIONS

Mario Kart Double Dash, 2003, Nintendo, manual.*
Sonic the Hedgehog, Sega, Jun. 23, 1991, p. 4.*
English language Abstract of JP 2005-6766, Jan. 13, 2005.
"Corocoro comic special edition, Bomber Man Story Official Guide Book", Shogakukan Inc., Mar. 10, 2002, Second Printing, pp. 87-91, with partial English language translation.
Japan Office Action in JP 2008-219191, dated Aug. 24, 2010, along with an English translation thereof.
Search report from E.P.O. for EP 09252057, mail date is Nov. 24, 2010.

* cited by examiner

Fig. 4

|  | Player character X | Player character Y | Player character Z |
|---|---|---|---|
| Command 1 | ◯ | ◯ | ◯ |
| Command 2 |  | ◯ | ◯ |
| Command 3 | ◯ |  | ◯ |
| Command 4 |  |  | ◯ |
| ⋮ | ⋮ | ⋮ | ⋮ |

VIDEO GAME PROCESSING DEVICE, VIDEO GAME PROCESSING METHOD AND VIDEO GAME PROCESSING PROGRAM

CROSS-REFERENCE TO RELATED APPLICATION

The present disclosure relates to subject matter contained in Japanese Patent Application No. 2008-219191, filed on Aug. 28, 2008, the disclosure of which is expressly incorporated herein by reference in its entirety.

BACKGROUND OF THE INVENTION

1. Field of the Invention

The present invention relates to a technique for controlling progress of a video game.

2. Description of the Related Art

In conventional techniques in this technical field, there have been provided various kinds of video games called "RPG" (Role Playing Game, which is a game in which a player acts parts of characters in a world of the game; grows through various experiences with pleasure; and during the growth, the player achieves predetermined aims).

In a video game processing device executing such a RPG, there is provided a technique for carrying out a play (battle) to another player operating another video game processing device such as a friend by utilizing a communication function such as wireless (radio) communication or wired (cable) communication (for example, see Patent Literature 1: Japanese Patent Application Publication No. 2005-6766).

However, in the video game carrying out the play through communication of the conventional technique mentioned above, in the case where there are differences in levels or capacities of characters operated in the game, one sided battle may be caused, which lacks in amusement for both the players, thus being inconvenient.

In order to obviate such a defect mentioned above, one proposal was made to make uniform the levels and capacities of the characters on the game. However, such a solution may make the battle or combat content in the play simple. Accordingly, it has been desired to propose a video game capable of providing communication play or battle rich in variety without such one sided battle.

SUMMARY OF THE INVENTION

The present invention was conceived in consideration of the circumstances encountered in the prior art mentioned above, and it is an object of the present invention to provide a technique capable of preventing one sided battle and carrying out communication play in which a battle rich in variety is carried out.

The above and other objects can be achieved according to the present invention by providing, in one aspect, a video game processing device for controlling progress of a video game by displaying a player character operated by a player. The video game processing device according to the present invention includes a communicator configured to carry out data communication with any of other video game processing devices respectively operated by other players.

The video game processing device also includes a command distributor configured to distribute commands to each of a plurality of other player characters operated by each of the other players of the other video game processing devices connected to each other by the communicator, each of the commands causing a predetermined special effect to the player character when the player instructs the video game processing device to execute the command.

The video game processing device also includes a command releaser configured to perform a command releasing operation, at a time when a predetermined releasing condition is satisfied, in which by erasing one or more command from the commands retained by the player character the one or more command is released.

The video game processing device also includes a command visualizer configured to visualize the released commands released by the command releaser as icons.

The video game processing device also includes a distance determiner configured to determine a distance between each of the released command icons iconified by the command visualizer and the player character.

The video game processing device also includes a command acquirer configured to cause the player character to newly retain any of the released commands in the case where the distance determiner determines that the player character exists inside a predetermined distance from the released command icon indicating the released command.

In a preferred embodiment of the above aspect, it may be desired that the command distributor is configured to determine at random the commands to be retained by the player character. Alternatively, the command distributor may be configured to determine the commands to be retained by the player character so as not to overlap the command to be retained with any of the commands that have been distributed to each of the other player characters.

The video game processing device may further include a command notifier configured to notify the player of only the commands distributed to the player character without notifying the player of the command distributed to each of the other player characters.

In the video game processing device, the predetermined releasing condition may be satisfied at a time when a hit point of the player character becomes less than a predetermined value, the player character is attacked with a predetermined attack, or a predetermined time elapses for a battle time.

The video game processing device may further include a level setter configured to set, at a time when the player character carries out a battle with the other player character operated by the other player in the other corresponding video game processing device with which a communication connection is established by the communicator, a level on the game for the player character so as to be commonly set to the player characters participating in the battle.

It may be further desired that the distance determiner is configured to determine that a collision is caused when a coordinate region in which the released command icon is positioned or a collision determination region provided in a specific region from a central coordinate of the released command icon is overlapped with at least a portion of a coordinate position at which the player character is positioned.

In another aspect of the present invention, there is also provided a video game processing method of controlling progress of a video game by displaying a player character operated by a player. The video game processing method according to the present invention includes carrying out data communication with any of other video game processing devices respectively operated by other players.

The video game processing method also includes distributing commands to each of a plurality of other player characters operated by each of the other players of the other video game processing devices connected to each other, each of the commands causing a predetermined special effect to the player character when the player instructs the video game processing device to execute the command.

The video game processing method also includes performing a command releasing operation, at a time when a predetermined releasing condition is satisfied, in which by erasing one or more command from the commands retained by the player character the one or more command is released.

The video game processing method also includes visualizing the released commands as icons.

The video game processing method also includes determining a distance between each of the released command icons and the player character.

The video game processing method also includes causing the player character to newly retain any of the released commands in the case where it is determined that the player character exists inside a predetermined distance from the released command icon indicating the released command.

In a further aspect of the present invention, there is also provided a video game processing program product for controlling progress of a video game by displaying player characters operated by players. The video game processing program product according to the present invention causes a computer to execute the steps carrying out data communication with any of other video game processing devices respectively operated by other players.

The steps also include distributing commands to each of a plurality of other player characters operated by each of the other players of the other video game processing devices connected to each other, each of the commands causing a predetermined special effect to the player character when the player instructs the video game processing device to execute the command.

The steps also include performing a command releasing operation, at a time when a predetermined releasing condition is satisfied, in which by erasing one or more command from the commands retained by the player character the one or more command is released.

The steps also include visualizing the released commands as icons.

The steps also include determining a distance between each of the released command icons and the player character.

The steps also include causing the player character to newly retain any of the released commands in the case where it is determined that the player character exists inside a predetermined distance from the released command icon indicating the released command.

According to the above aspects of the present invention, there can be provided a technique capable of preventing one sided battle and performing communication play in which a battle rich in variety is carried out.

Furthermore, there can be realized an auction system with no fear of causing any trouble between users in a video game play.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings:

FIG. 4 is an explanation view showing one example of a of retained (owned) command data table;

DETAILED DESCRIPTION OF THE INVENTION

Hereinafter, one embodiment of the present invention will be described with reference to the accompanying drawings.

Figure 1:
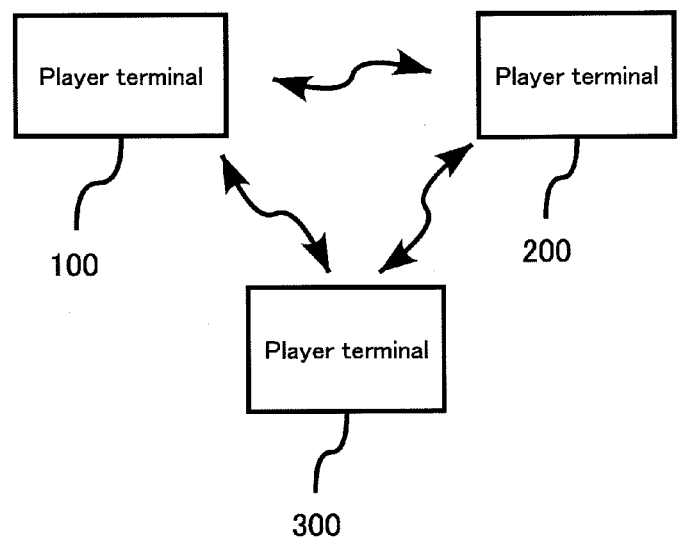
FIG. 1 is a view showing a network relationship between a main player terminal and other player terminals.

FIG. 1 is a block diagram showing a player terminal 100 representing one embodiment of a video game processing device according to the present invention and other player terminals 200 and 300 of the other video game processing devices each having a configuration similar to that of the player terminal 100. The player terminal 100 is managed by a user "A". The player terminal 100 is operated or controlled by the user "A", whereby the game proceeds in accordance with this operation. Likely, the player terminal 200 is managed by a user "B". The player terminal 200 is operated or controlled by the user "B", whereby the game proceeds in accordance with this operation. Furthermore, the player terminal 300 is managed by a user "C". The player terminal 300 is operated or controlled by the user "C", whereby the game proceeds in accordance with this operation. Each of the player terminals 100, 200 and 300 has a communication function for carrying out wireless communication. As these player terminals 100, 200 and 300, various information processing devices such as portable game equipments, install-type game equipments, computer devices, portable phones and the like may be applicable.

Figure 2:
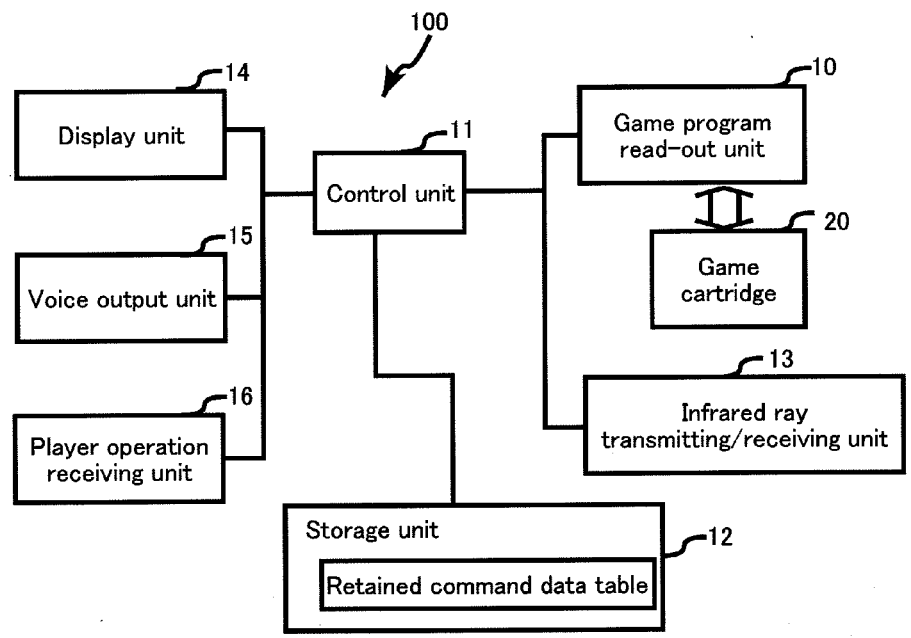
FIG. 2 is a block diagram showing one example of a configuration of the main player terminal shown in FIG. 1.

FIG. 2 is a block diagram showing a configuration example of the player terminal 100. As shown in FIG. 2, the player terminal 100 includes a game program read-out unit 10, a control unit 11, a storage unit 12, an infrared ray transmitting/receiving unit 13, a display unit 14, a voice output unit 15, and a player operation receiving unit 16. Further, the player terminals 200 and 300 also include substantially the same units as mentioned above.

The game program read-out unit 10 detachably receives a game cartridge 20 in which a memory medium for storing a game program is embedded. The game program read-out unit 10 serves to read out a necessary game program from the memory medium in the inserted game cartridge 20. Further, in this embodiment, the memory medium embedded in the game cartridge 20 is one in which a video game program classified to the RPG is stored.

The control unit 11 serves to execute the game program read out by the game program read-out unit 10 and cause the video game to proceed in response to operations of the player, i.e., the player "A" in this embodiment.

The storage unit 12 is a memory medium for storing the game program or data necessary for progress of the video game. The storage unit 12 is composed of a nonvolatile memory such as a RAM. In the storage unit 12, various kinds of information such as a retained command data table in which retained command data set and updated at a time when a communication play with the other terminals 200 and 300 is carried out are included are stored, which will be described later.

The infrared ray transmitting/receiving unit 13 serves to transmit and receive the infrared ray for the communication with the player terminals 200, 300. The display unit 14 displays a play condition on a game screen in accordance with progress of the game or operations by the player under the control of the control unit 11. The display unit 14 is composed of a liquid crystal device, for example.

The voice output unit 15 outputs voice (audio) in accordance with progress of the game or operations by the player under the control of the control unit 11. The player operation receiving unit 16 includes a plurality of buttons and the like and is operated by the operations of the user "A". The control unit 11 is informed of a result thereof.

The player terminal 100 of the present embodiment adopts a system for reading out the game program from the game cartridge 20. However, the player terminal 100 may be configured so that the game program is downloaded by means of wireless or wired communication.

Next, the operation of the player terminal 100 according to the present embodiment will be explained.

Figure 3:
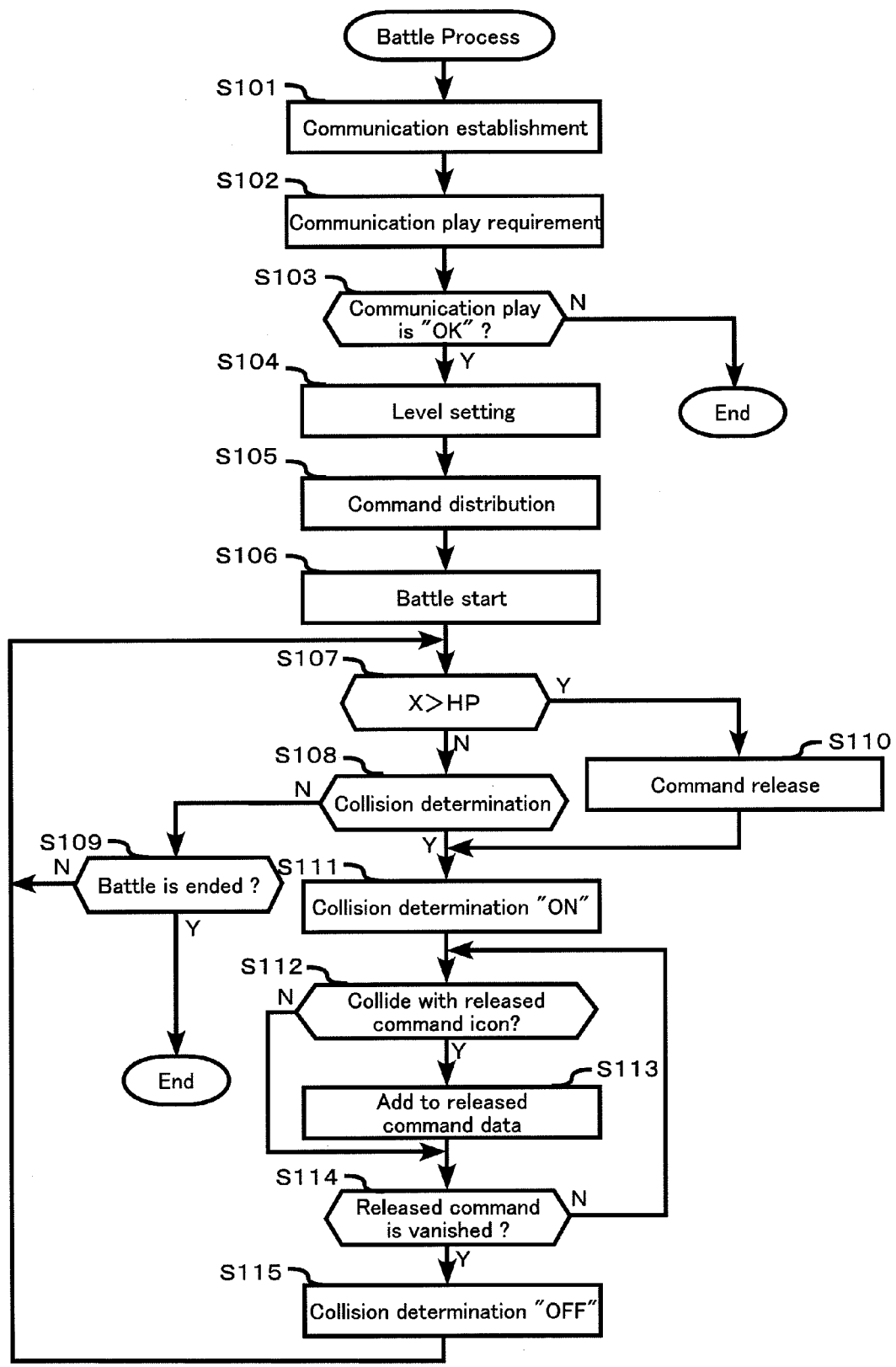
FIG. 3 is a flowchart showing one example of a battle process.

FIG. 3 is a flowchart showing one example of a battle process executed by the player terminal 100. Herein, the case where the communication play or battle is executed among the player terminals 100, 200 and 300, in which a player character "X" operated by the user "A" in the player terminal 100, a player character "Y" operated by the user "B" in the player terminal 200, and a player character "Z" operated by the user "C" in the player terminal 300 are battled in a predetermined battle field will be explained as one example.

In the battle process, if the operation of the user "A" received by the player operation receiving unit 16 indicates a communication establishment indication, a communication with the other player terminal through the infrared ray transmitting/receiving unit 13 is established by the control unit 11 (Step S101). For example, in the case where the other player terminals 200 and 300 are positioned in a communication available area at the time when the player operation receiving unit 16 receives the communication establishment indication, the control unit 11 controls the infrared ray transmitting/receiving unit 13 so as to establish the communication between the player terminal 100 and each of the player terminals 200, 300. In the present embodiment, it is provided that the communication between the player terminals 200 and 300 is established by the control units 11 in the same manner. Further, it is to be noted that the establishment of the communication may be achieved by a known technique.

Next, the control unit 11 requires to carry out the communication play to the player terminals 200 and 300 in the case where the operation of the user "A" received by the player operation receiving unit 16 indicates a communication play requirement (Step S102). Herein, the "communication play requirement" is a requirement for carrying out the communication play of the player character "X" to the player character "Y" operated by the user "B" in the player terminal 200 or the player character "Z" operated by the user "C" in the player terminal 300.

In the described embodiment, the control unit 11 causes the display unit 14 to display a selection button which can select the "communication play requirement", for example, on the game screen displayed in the display unit 14 in the case where the communication is established between the player terminal 100 and each of the player terminals 200 and 300. Then, at Step S102, the control unit 11 executes the communication play requirement to the player terminals 200 and 300 in accordance with the reception of a push-down operation of the selection button by means of the player operation receiving unit 16.

The player terminals 200 and 300 receiving the communication play requirement from the player terminal 100 carry out confirmation display, on the game screens displayed in the display units 14 provided in the respective player terminals 200 and 300, for confirming whether the communication play requirement from the player character "X" operated by the user "A" of the player terminal 100 is accepted or not. In the case where it is selected that the communication play requirement should be accepted, by the operations of the users "B" and "C", the communication play "OK" is made as a response to the requirement. On the contrary, in the case where it is selected that the communication play requirement should not be accepted, by the operations of the users "B" and "C", the communication play "NG" is made as a response to the requirement.

When the control unit 11 receives "OK" of the communication play from the player terminals 200 and 300 ("Yes" at Step S103), a level setting process for setting a level of the player character "X" is carried out (Step 104), and a command to be retained by the player character "X" is determined and distributed (or given) (Step S105). Further, in the similar manner, in the player terminals 200 and 300, level setting processes for setting levels of the player characters "Y" and "Z" are made and commands to be retained by the player characters "Y" and "Z" are determined and distributed (or given), respectively.

In the present embodiment, regardless of the present level of the player character using a single mode (i.e., a mode for progress of a game alone by a player at a non-communication period), as mentioned above, the levels of all the player characters participating in the communication play can be made uniform to thereby preliminarily avoid possibility of causing a case such that, in a battle between players having a large difference in their levels, one of the players feels insufficiency or the other of the players losses win without amusing the battle, and this makes possible to carry out the battle under approximately fair condition even if the battle is done between players who meet first with each other.

Likely, a plurality of motion patterns, each called "command", are distributed (or given) to each of the player characters. In a usual single mode, the setting is made such that as the level of the player character increases, many commands are acquired and the selection of the motion patterns is thereby widened, or the level of the even the same command also increases in accordance with increase of the level of the player character, whereby an effect at a time of activating such a command is increased. However, in order to make contents of the retained commands between the respective player characters participating in the battle uniform to an extent, in the present embodiment, the battle is caused to start after distributing the same number of plural kinds of commands to each of the player characters at timing to start the play, for example. At this time, there may be taken a configuration giving weight on faithfulness between the respective player characters by distributing a set of the quite same commands to all the player characters, but the commands to be distributed may be randomly determined by weighting the amusement in the game or distribute a set of preliminarily prepared commands relatively favorable in the battle or a set of preliminarily prepared commands relatively unfavorable in the battle, whereby somewhat advantage or disadvantage may be provided to the contents of the commands to be distributed.

That is, in a card game such as represented by trump (playing card) game, like an image such that cards may be distributed at the first time of the game to the respective players, the control unit 11 may shuffle plural kinds of commands and then distribute them to the players. At this time, by mixing ones which are extremely available for the battle or play in the contents of the commands to be distributed, an amusement in change may be increased even at the time of merely distributing the commands. Moreover, as like the card in the trump game, it may take a system in which it is not made apparent what contents of commands are distributed to what player characters other than the contents distributed to the own player. By adopting such a system, it is possible to obtain an amusement of assuming, in progress of the game and the battle, what player characters retain what contents of commands.

The control unit 11 determines, at Step S105, the commands (retained command data) to be retained by the player character "X" and registers them to a retained command data table. Further, the control unit 11 receives notification of the commands to be retained by the player characters "Y" and "Z" from the player terminals 200 and 300, respectively, and then sets the commands in the retained command data table in the similar manner mentioned above. FIG. 4 is an explanation view showing an example of the retained command data table. The retained command data table is a table in which command retained data distributed and retained by the respective player characters "X", "Y" and "Z" are stored. The commands shown by the retained command data registered in the retained command data table become usable for the respective player characters "X", "Y" and "Z" in the communication play. In this regard, for example, Command 1 in the table is an essential command for the battle such as "fight", which is determined as an "essential command", necessarily distributed to each of the player characters and is never released. This is because the player character is prevented from falling in a substantially battle-impossible condition by taking out all the commands by the other players in the case where "scramble of commands", which will be explained hereinafter, is executed.

In the present embodiment, it is prescribed that in the player terminal operated by its own player each of the players can confirm only the retained commands of the player character operated by its own player terminal. That is, the player cannot confirm the retained commands retained by the player character operated by the other player. Therefore, for example, the player terminal 100 causes the display unit 14 to display only the retained commands of the player character "X" available in inspection in the case where the retained command browsing requirement is received from the player "A".

When the retained commands are distributed, the control unit 11 discloses a battle in a predetermined field (Step S106). During the battle, the control unit 11 receives, for example, the selection of the retained command of the player character "X" from the player "A" and executes play or operation in accordance with the selection of the retained command. Furthermore, the control unit 11 executes a subtraction process of an HP (Hit Point) of the player character "X" in accordance with damage applied to the player character "X".

Furthermore, during the battle, the control unit 11 monitors whether the HP of the player character "X" becomes less than a predetermined threshold value "X" or not (Step S107), whether the retained commands of the other player characters "Y" and "Z" are released or not (Step S108), and whether the battle is terminated or not (Step S109). The control unit 11 determines that the battle is terminated at a time when a predetermined battle time elapses, when the HPs of all the characters other than any one player character becomes zero (0) (i.e., they become a battle-impossible condition), or when any one of the players "A", "B" and "C" carries out a battle ending operation ("Yes" at Step S109).

In the monitoring state at Steps S107 to S109, in the case where the HP of the player character "X" becomes less than the predetermined threshold value "X" ("Yes" at Step S107), the control unit 11 executes the process such that all or a part of the retained commands other than the "essential command" mentioned above in the retained commands retained by the player character "X" (Step S110). At Step S110, the control unit 11 determines one or more command to be released (hereinafter, referred to as a "released command") from the commands retained by the player character "X" by referring to the retained command data table. The control unit 11 erases the released command from the retained commands of the player character "X", and performs a command releasing operation in which an icon indicating the released command (hereinafter, referred to as a "released command icon") splashes around the player character "X" on the battle screen displayed in the display unit 14.

At this time, in the case where the released command is "a part of the retained commands", various settings can be made as to how a released command is selected. First, the number of commands to be released may always be determined or may be determined in accordance with strength of finally applied attack, the degree of lowering less than the threshold value of the HP or the like. Otherwise, interest or taste may be enhanced by randomly determining the number of commands to be released every time. In addition, the selection as to what command is to be released may be made, after the number of commands to be released has been determined, in accordance with the ascending order (or descending order) of frequency in use, the ascending order (or descending order) of offensive power, the alphabetic order of the command names or the like. Otherwise, the selection may be made at random every time.

Figure 5:
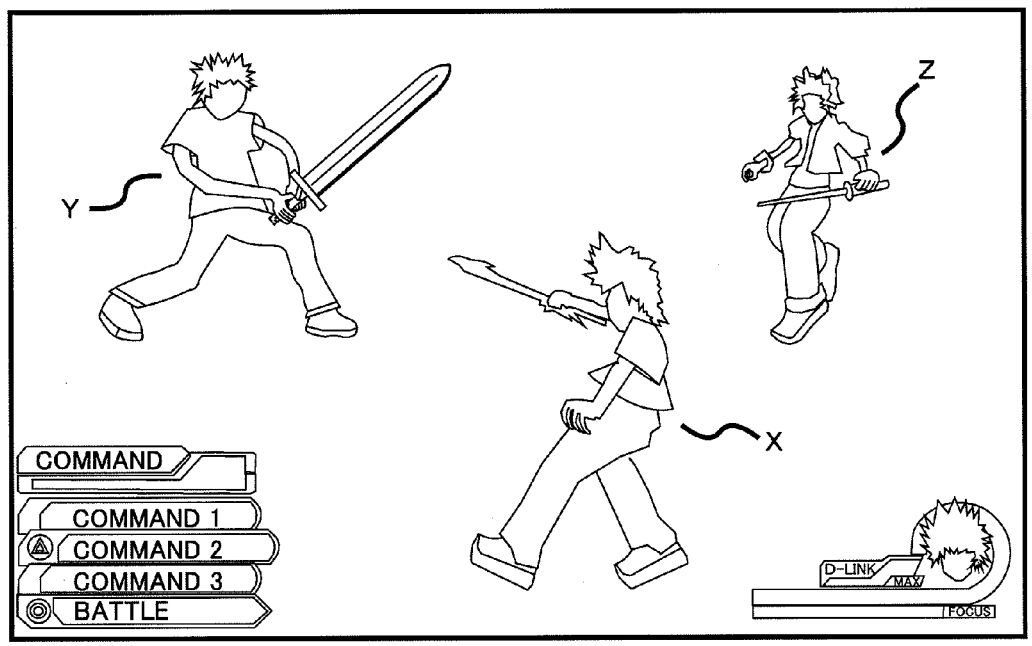
FIG. 5 is an explanation view showing one example of a battle screen.
Figure 6:
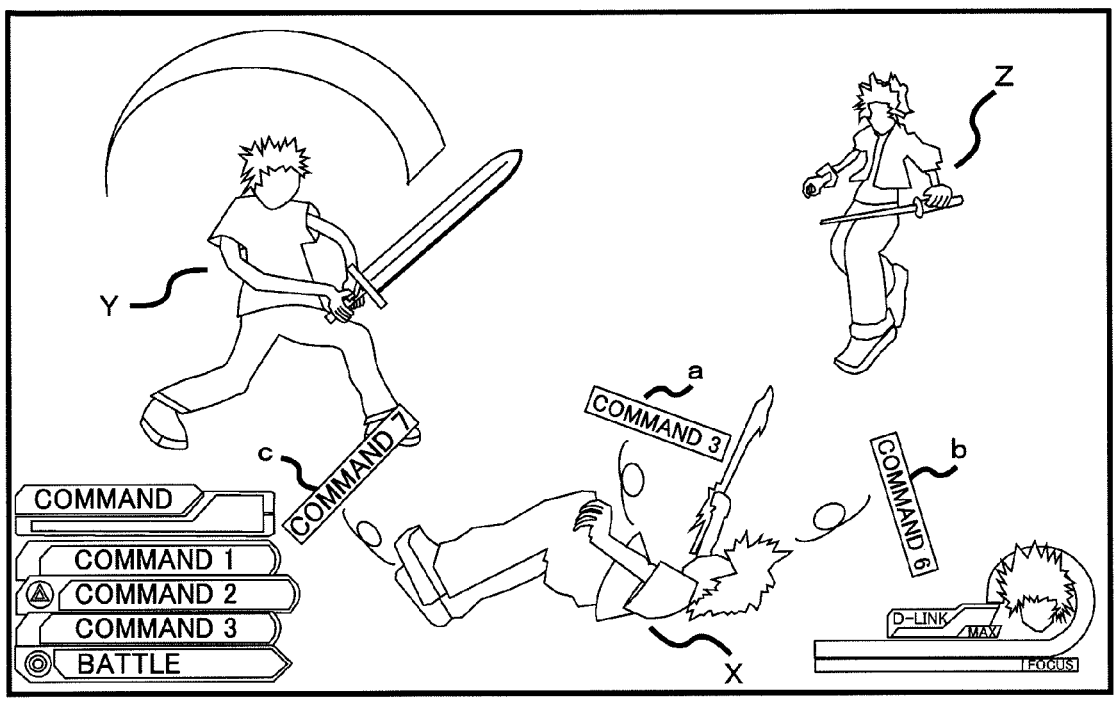
FIG. 6 is an explanation view showing another example of the battle screen.
Figure 7:
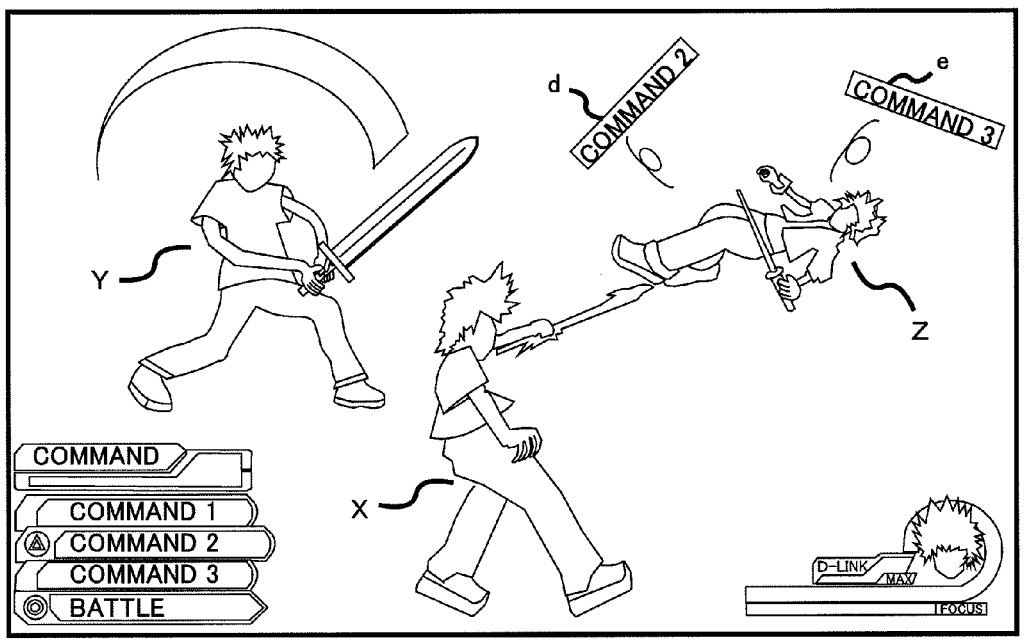
FIG. 7 is an explanation view showing still another example of the battle screen.

For example, as shown in FIG. 5, in the case where the HP of the player character "X" becomes less than the threshold value "X" by the attack of the player character "Y" when the player characters "X", "Y" and "Z" carry out a battle in a face-to-face manner, in the command releasing operation, for example, as shown in FIG. 6, the state that the released command icons "a", "b" and "c" are splashed (i.e., visualized) around the player character "X" is displayed in the display unit 14. Names (Commands 3, 6, 7, herein) of corresponding commands are displayed on the released command icons "a", "b" and "c", respectively. Further, in the case where the retained commands of the other player characters "Y" and "Z" are released, in accordance with instructions from the player terminals 200 and 300, the state that the released command icons are respectively splashed around the player characters "Y" and "Z" is also displayed in the display unit 14 in the similar manner mentioned above. More specifically, in the case where the HP of the player character "Z" becomes less than the threshold value "X" by the attack of the player character "X", in the command releasing operation, for example, as shown in FIG. 7, the state that the released command icons "d" and "e" are splashed around the player character "Z" is displayed in the display unit 14. The splashed released command icons are displayed so as to be fixed within the battle screen (i.e., fixed at a predetermined coordinate position in the game field or game space) or so as to be moved (i.e., so that the coordinate position is moved in the game field or game space).

By performing the released command splashing operation in this manner, what kind of command the player character of which command was released had retained can be visually observed by the other player.

Next, when the process of releasing the retained command of the player character "X" is terminated at Step S110, or when the command releasing operation in the case of releasing the retained commands of the other player characters "Y" and "Z" is performed ("Yes" at Step S108), the control unit 11 executes the controlling of the collision determination "ON" state (Step S111). In the collision determination "ON" state, the control unit 11 is in a state of tracing the position coordinates about all the splashed released command icons and monitoring whether a part of each of the player characters enters a coordinate range in which any of the released command icons is positioned or a collision determination range provided in a specific range from the central coordinate of each of the released command icons. In this case, the control unit 11 determines a distance between each of the released command icons and the player character "X".

Figure 8:
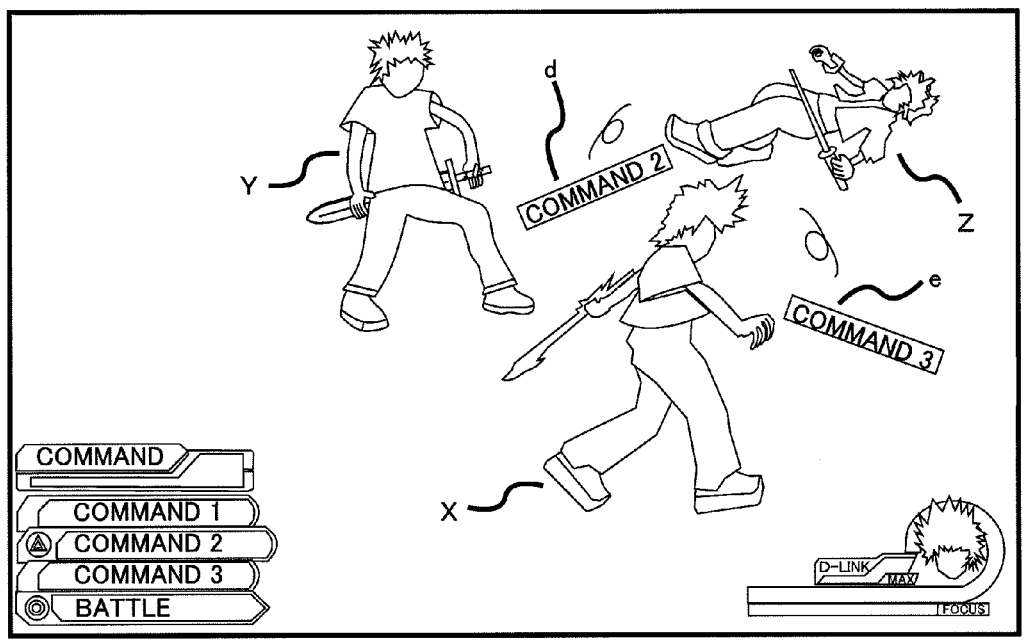
FIG. 8 is an explanation view showing a further example of the battle screen.

In the case where the command is released as shown in FIG. 7, the respective player characters "X", "Y", and "Z" move toward positions at which the released command icons are splashed for picking up the splashed released command icons to acquire the released commands in accordance with operations of the players "A", "B" and "C", as shown in FIG. 8. Herein, any of the player characters by oneself can pick up the released commands that have been released by oneself. According to such settings, it is possible to increase participants of a pick-up battle of the released commands, and it can be expected that amusement in battle increases. However, the player terminal may be configured to control so that each player character cannot acquire the released command that have been released by oneself. In such a case, the player character of which command has been released does not participate in the pick-up battle of the released command until a predetermined time elapses, by which the setting may be adjusted such that the other player can acquire the command released by oneself more easily than the player character reacquires it. Further, the control may be executed so that only the player character that carries out an attack causing the commands to be released can pick up the released commands.

In the case shown in FIG. 8, each of the released command icons "d" and "e" splashed due to the fact that the HP of the player character "Z" becomes less than the threshold value by the attack of the player character "Y" becomes the collision determination "ON" state. In the case where it is determined that a portion of the body of the player character enters a display region of the icon (that is, collision determination is carried out), it is determined what player character collides with it, and the corresponding command is added to the retained commands of the determined player character. For example, in the case where a portion of the player character "X" enters a coordinate range of the released command icon "d", the control unit 11 determines that the player character "X" collides with the released command icon ("Yes" at Step S112). The control unit 11 then erases the collided released command icon from the battle screen, and adds the command indicated by the collided released command icon to the retained commands of the player character "X" (Step S113). Namely, in the case where it is determined that the player character "X" exists inside a predetermined distance from the released command icon indicating the released command, the player character "X" is caused to newly retain the released command.

Thereafter, in the case where each of the commands indicated by the released command icons is retained in any of the player characters and all the released command icons are thereby erased ("Yes" at Step S114), the control unit 11 executes the controlling of the collision determination "OFF" and releases the collision monitoring state (Step S115). The control unit 11 then causes the processing flow to shift to the process of Step S107.

In this case, even in the case where any released command, which has not been acquired by any player character and thus remains in a non-erased state, exists, all the released command icons remaining, without being picked up, on the screen after a predetermined limit time elapses may be vanished. By taking such a process, the total number of commands usable in the battle play is gradually reduced. In addition, by setting the limit time until the released command icons are to be vanished so as to be gradually shortened as the battle time elapses, the pick-up battle of the command becomes violent as the battle time is prolonged. This makes it possible to increase game amusement performance.

According to the operation and processes described above, in the case where three player characters "X", "Y" and "Z" carry out communication battle play in a battle field, the levels of the respective player characters "X", "Y" and "Z" are first unified, and a process for distributing (or giving) commands to be retained by the respective player characters "X", "Y" and "Z" is executed. Subsequently, in the case where the HP of any one of the player characters "X", "Y" and "Z" becomes less than the predetermined threshold value "X" when the battle is being carried out while generating the retained commands, the operation such that one or more retained commands retained by the player character having the HP less than the predetermined threshold value "X" is splashed on the battle field (i.e., a display operation in which released command icon is splashed) is executed, and a pick-up battle of the released command (battle for acquiring the released command icon) by the player characters "X", "Y" and "Z" is then executed. A result of the pick-up battle of the command is determined by collision determination between each of the splashed retained command icons and each of the player characters. The control is carried out so that the player character acquiring (or picking up) the released command can use the acquired command as the retained commands in the subsequent battle.

Further, in the above embodiment, although the video game processing device is configured so that the control relating to each of the player characters "X", "Y" and "Z" is carried out by the corresponding player terminal 100, 200 or 300, for example, it may be configured so that the player terminal 100 functions as a server to carry out the control relating to the respective player characters "X", "Y" and "Z" as a whole.

Furthermore, in the above embodiment, although it has been explained that the battle is suspended until all the commands are acquired after the commands have been released, the video game processing device may be configured so that the battle is continued even if the pick-up battle of the command is carried out and the attack and the like can be made even in the state that the command is being released.

As explained above, the video game processing device (player terminal 100) for controlling the progress of the video game by displaying the player characters "X" operated by the player "A" is configured so as to have a communication establishment function for establishing the communication connection for carrying out the data communication with the other video game processing devices (player terminals 200, 300), that is, to carry out data communication with any of other video game processing devices (player characters 200, 300) respectively operated by the other players "B", "C". In addition, in the other video game processing devices in which the communication connection is established, when the player character "X" carries out the battle with the other player characters "Y" and "Z" operated by the other players "B", "C", the retained command to be retained by the player character "X" is applied (or distributed) to the player character "X". In this case, each of the commands causes a predetermined special effect to the player character "X" when the player "A" instructs the video game processing device (player terminal 100) to execute the command. When the predetermined releasing condition is satisfied, the command releasing operation in which by erasing one or more command from the commands retained by the player character "X" the one or more command is released is performed. Namely, one or more retained command retained by the player character "X" is deleted from the commands retained by the player character "X", thus releasing the retained command. In addition, the command releasing operation, in which the released command icon representing the command released from the player character "X" is splashed within the screen, is performed. A distance between each of the released command icons released by the player characters "Y" and "Z" and the player character "X" is determined. Namely, the collision determination, in which in the other video game processing device, it is determined whether the released command icons representing the commands released from the other player characters "Y" and "Z" as well as the player character "X" are collided with the player character "X" on the battle screen or not, is executed. In accordance with the determination such that the player character "X" collides with any of the released command icons by the collision determination, the collided released command icon is erased from the battle screen, and the command represented by the collided released command icon is applied (or distributed) to the player character "X" as command to be retained by the player character "X". Namely, in the case where it is determined that the player character exists inside the predetermined distance from the released command icon indicating the released command released from the player characters "Y" and "Z", the player character "X" is caused to newly retain the released command. According to these features, it becomes possible to carry out the communication play in which the battle rich in variety can be developed without one sided video game development.

That is, in an event when a player character of one player carries out the play with the other player character of the other player through communication, the present invention has the feature in which newly retained command is distributed without using a command beforehand retained, so that it becomes possible to take balance between the retained commands retained by the respective player characters. In addition, it becomes possible to prevent expansion in ability difference between the commands of the players from causing, so that the communication play can be controlled so as to prevent the development of one sided battle.

Furthermore, according to the configuration of the present embodiment, when the commands applied (or distributed) at the battle starting time can be released if the predetermined releasing conditions are satisfied, and the released commands can be acquired by the other player character. Therefore, the communication play in which the battle rich in variety is developed can be carried out.

Still furthermore, in the described embodiment, in the case where the video game processing device (player terminal 100) determines at random the command to be retained by the player character "X", it becomes possible to determine the command to be retained through a simple control.

Still furthermore, in the described embodiment, in the case where the video game processing device (player terminal 100) determines that the commands to be retained by the player character "X" are not overlapped with the retained commands distributed to the other player characters "Y" and "Z", it is possible to carry out the battle between players having different characters. In addition, since it becomes possible to acquire commands that are not retained by oneself through the battle, the communication play in which the battle rich in variety is developed can be carried out.

Still furthermore, in the described embodiment, the video game processing device (player terminal 100) has the feature to notify the player "A" of only the retained commands distributed to the player character "X" without notifying the player "A" of the retained commands distributed to the other player characters "Y" and "Z". Thus, it is possible to prevent the player "A" of the player character "X" from being notified what kinds of commands are distributed to the other player characters "Y" and "Z". Therefore, since the battle can be controlled while predicting the command retained by the counter player, the communication play in which the battle rich in variety is developed can be carried out.

Still furthermore, according to the described embodiment, as the predetermined releasing condition, it is determined whether the HP (hit point) of the player character becomes less than the predetermined threshold value "X". However, the video game processing device may be configured so that, for example, when the player character is attacked with a predetermined attack (for example, an attack using a specific command for releasing the command) or when the predetermined time elapses for the battle time, the predetermined releasing condition is satisfied.

Still furthermore, in the described embodiment, when the video game processing device (player terminal 100) carries out the battle against the other player characters "Y" and "Z" operated by the other players in the other video game processing devices (player terminals 200 and 300) with which the communication connection is established, the level on the game for the player character "X" is set so as to be commonly set to the player characters participating in the battle. Thus, the levels on the game of the respective player characters "X", "Y" and "Z" that carry out the battle play can be made uniform, thereby controlling the game so as to carry out the communication play without causing one sided battle.

Still furthermore, in the described embodiment, there is provided the feature in which the video game processing device (player terminal 100) determines that the collision is caused at a time when the coordinate range in which the released command icon is positioned or the collision determination region provided in the specific range from the central coordinate of the released command icon is overlapped with at least a portion of the coordinate position at which the player character "X" is positioned, and according to this determination, the player character "X" is caused to retain the command represented by the released command icon. Therefore, the command corresponding to the player character that first reaches the position at which the released command icon is splashed can be distributed to the player character, thereby easily making determination in a pick-up battle of the released command.

Still furthermore, although, in the described embodiment, the respective player terminals 100, 200 and 300 are configured so as to carry out short distance communication by means of infrared ray, any other communication method may be adopted. Further, there may be also adopted a method in which game information is delivered to the respective player terminals 100, 200 and 300 from an online video game control server.

In this regard, although it is not referred to in the above-described embodiment, the control may be made so that only the player character having a specific command (for example, a "command scramble" command) can divest (or acquire) the released command. In such a case, for the other player characters "Y" and "Z", it may be necessary to pay attention to the player character "X" retaining the "command scramble" command so as not to divest the command. Because of this reason, it is desired to display on the screen such a display that the other player characters "Y" and "Z" can identify that the player character "X" retains the "command scramble" command.

In the case where it is made possible only for the character retaining the "command scramble" command to divest (or acquire) the command, it is desired that this "command scramble" command is vanished if it is used for predetermined times or vanished as a specified time elapses after acquiring the command. Furthermore, concerning the acquisition of the "command scramble" command, it may suddenly appear on the battle screen during the battle so as to be taken on a first-come-first-served basis. Moreover, as a so-called hidden item, the "command scramble" command may be acquired by taking a specific action at a specific portion.

Furthermore, although the battle in the RPG has been explained as one example in the above embodiment, the present invention is not limited to this example. The present invention can be applied to any other video games than the RPG so long as a battle is carried out using a command.

In this regard, although it is not specifically referred to in the described embodiment, the video game processing device (player terminal 100) executes the various processes described above in accordance with a control program (video game processing program) stored in the database provided for itself.

According to the present invention, it is useful to carry out a communication play in which a battle rich in variety is developed without being developed as one sided game in the video game.

It is further to be noted that the present invention is not limited to the described embodiment, and many other changes and modifications may be made without departing from the spirit and scope of the present invention.

What is claimed is:

1. A video game processing device for controlling a progress
    of a video game by displaying a player character operated by a player, the video game processing device comprising:
    a communicator configured to carry out data communication with any of other video game processing devices operated by other players;
    a command distributor configured to distribute distributed commands to each of a plurality of other player characters, the plurality of other player characters being operated by each of the other players of the other video game processing devices, each distributed command of the distributed commands causing a predetermined special effect to the player character when the player instructs the video game processing device to execute the distributed command;
    a command releaser configured to perform a command releasing operation, when a predetermined releasing condition is satisfied, in which, by erasing at least one released command from retained commands retained by the player character, the at least one released command is released;
    a command visualizer configured to visualize the at least one released command released by the command releaser as at least one released command icon;
    a distance determiner configured to determine a distance between each of the at least one released command icon iconified by the command visualizer and the player character;
    a collision determiner configured to determine that a collision occurs between the player character and a released command icon of the at least one released command icon indicating a released command of the at least one released command; and
    a command acquirer configured to cause the player character to newly retain the released command when the collision determiner determines that the collision occurs between the player character and the released command icon,
    wherein the collision determiner is configured to determine that the collision occurs when a collision determination region provided a predetermined distance from a central coordinate of the released command icon is overlapped with at least a portion of a coordinate position at which the player character is positioned, the released command icon being configured to move about the central coordinate;
    wherein a number of the at least one released command released by the command releaser is determined based on a strength of a finally applied attack on the player character.

2. The video game processing device according to claim 1, wherein the command distributor is configured to randomly determine the retained commands to be retained by the player character.

3. The video game processing device according to claim 1, wherein the command distributor is configured to determine the retained commands to be retained by the player character so as not to overlap with any of the distributed commands that have been distributed to each of the plurality of other player characters.

4. The video game processing device according to claim 1, further comprising:
    a command notifier configured to notify the player of only the retained commands retained by the player character without notifying the player of the distributed commands distributed to each of the plurality of other player characters.

5. The video game processing device according to claim 1, wherein the predetermined releasing condition is satisfied when one of a hit point of the player character becomes less than a predetermined value, the player character is attacked with a predetermined attack, and a predetermined time elapses for a battle time.

6. The video game processing device according to claim 1, further comprising:
    a level setter configured to commonly set a player capacity level for the player character and each of the plurality of other player characters participating in the battle.

7. The video game processing device according to claim 1, wherein the collision determiner is further configured to determine that the collision occurs when a coordinate region in which the at least one released command icon indicating the released command is positioned is overlapped with at least a portion of the coordinate position at which the player character is positioned.

8. The video game processing device according to claim 1, wherein the command acquirer is configured to not newly retain the released command when the released command is released by the player character.

9. The video game processing device according to claim 1, wherein the at least one released command released by the command releaser is selected by the player.

10. The video game processing device according to claim 1, wherein the at least one released command released by the command releaser is determined based on a frequency of use of the retained commands.

11. The video game processing device according to claim 1, wherein the at least one released command released by the command releaser is determined based on an offensive power of the retained commands.

12. The video game processing device according to claim 1, wherein the at least one released command released by the command releaser is randomly determined.

13. The video game processing device according to claim 1, wherein the distributed commands are distributed by the command distributor at a battle starting time.

14. The video game processing device according to claim 1, wherein each of the at least one released command icon is configured to vanish after a predetermined time elapses.

15. The video game processing device according to claim 14, wherein the predetermined time is configured to gradually decreases as a battle time elapses.

16. A video game processing method of controlling a progress of a video game by displaying a player character operated by a player, the video game processing method comprising:
   carrying out data communication with any of other video game processing devices operated by other players;
   distributing distributed commands to each of a plurality of other player characters, the plurality of other player characters being operated by the other players of the other video game processing devices, each distributed command of the distributed commands causing a predetermined special effect to the player character when the player instructs the video game processing device to execute the distributed command;
   performing a command releasing operation, when a predetermined releasing condition is satisfied, in which, by erasing at least one released command from retained commands retained by the player character, the at least one or more released command is released;
   visualizing the at least one released commands command as at least one released command icon;
   determining a distance between each of the at least one released command icon and the player character;
   determining that a collision occurs between the player character and a released command icon of the at least one released command icon indicating a released command of the at least one released command; and
   causing the player character to newly retain the released command when the collision is determined to occur between the player character and the released command icon,
   wherein the collision is determined to occur when a collision determination region provided a predetermined distance from a central coordinate of the released command icon is overlapped with at least a portion of a coordinate position at which the player character is positioned, the released command icon being configured to move about the central coordinate;
   wherein a number of the at least one released command released by the command releaser is determined based on a strength of a finally applied attack on the player character.

17. A non-transitory computer-readable medium including a video game processing program for controlling a progress of a video game by displaying a player character operated by a player, the non-transitory computer-readable medium, when the video game processing program product is executed, causing a computer to execute:
   carrying out data communication with any of other video game processing devices operated by other players;
   distributing distributed commands to each of a plurality of other player characters, the plurality of other player characters being operated by the other players of the other video game processing devices, each distributed command of the distributed commands causing a predetermined special effect to the player character when the player instructs the video game processing device to execute the distributed command;
   performing a command releasing operation, when a predetermined releasing condition is satisfied, in which, by erasing at least one released command from retained commands retained by the player character, the at least one released command is released;
   visualizing the at least one released command as at least one released command icon;
   determining a distance between each of the at least one released command icon and the player character;
   determining that a collision occurs between the player character and a released command icon of the at least one released command icon indicating a released command of the at least one released command; and
   causing the player character to newly retain the released command when the collision is determined to occur between the player character and the released command icon,
   wherein the collision is determined to occur when a collision determination region provided a predetermined distance from a central coordinate of the released command icon is overlapped with at least a portion of a coordinate position at which the player character is positioned, the released command icon being configured to move about the central coordinate;
   wherein a number of the at least one released command released by the command releaser is determined based on a strength of a finally applied attack on the player character.

* * * * *